(12) United States Patent
Lebedev et al.

(10) Patent No.: US 6,315,100 B1
(45) Date of Patent: Nov. 13, 2001

(54) BELT CONVEYOR

(75) Inventors: Alla Lebedev; John R. Strong, both of Kirkland, WA (US)

(73) Assignee: Frigoscandia Equipment AB, Helsingborg (SE)

(*) Notice: Subject to any disclaimer, the term of this patent is extended or adjusted under 35 U.S.C. 154(b) by 0 days.

(21) Appl. No.: 09/275,493

(22) Filed: Mar. 24, 1999

(51) Int. Cl.[7] ............ B21B 39/00; B23B 13/00; B23D 47/04; B23Q 5/22; B23Q 7/00

(52) U.S. Cl. ............ 198/339.1; 198/415; 198/416

(58) Field of Search ............ 198/445, 446, 198/415, 416, 339.1

(56) References Cited

U.S. PATENT DOCUMENTS

| | | | |
|---|---|---|---|
| 1,755,721 | * 4/1930 | Winkler et al. | 198/446 |
| 2,456,031 | * 12/1948 | Spain | 198/446 |
| 3,068,989 | * 12/1962 | Packman et al. | 198/415 X |
| 4,368,664 | * 1/1983 | Smith et al. | 99/386 X |
| 5,148,923 | * 9/1992 | Fraenkel et al. | 198/445 X |

* cited by examiner

Primary Examiner—Christopher P. Ellis
Assistant Examiner—Gene O. Crawford
(74) Attorney, Agent, or Firm—Christensen O'Connor Johnson Kindness PLLC

(57) ABSTRACT

A belt conveyor comprises an endless conveyor belt and first and second rollers. The endless belt follows a conveyance path from the first roller to the second roller and a return path from the second roller to the first roller. The belt conveyor further comprises a plurality or parallel lines extending over the conveyor belt along the whole conveyance path and over and away from the second roller along a plane deviating from the plane of the conveyance path. The belt conveyor may be used in a food treating apparatus having a housing for conveyance of articles therethrough, and the housing may be used for treating, e.g. freezing, food products by impingement means.

35 Claims, 3 Drawing Sheets

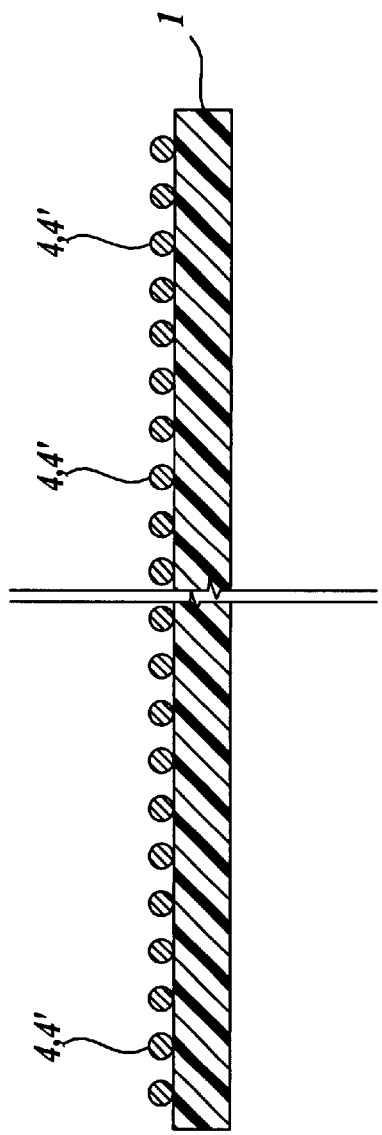
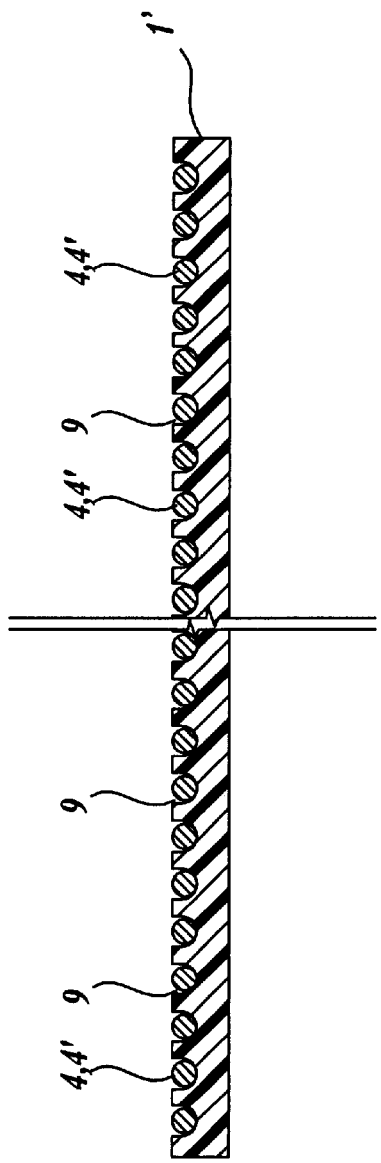

BELT CONVEYOR

FIELD OF THE INVENTION

The present invention is related to belt conveyors, particularly belt conveyors for conveyance of products being treated during the conveyance and having a tendency of sticking to the conveyor belt.

BACKGROUND OF THE INVENTION

Removing unfrozen or completely frozen food products from the discharge end of a belt conveyor is generally quite easy. Unfrozen products have little adhesion to the belt and are easily removed by gravity or a tight fitting scraper. Fully frozen products often adhere to the belt, but are rigid and are easily removed by a rigid scraper.

There are times when it is desirable to remove products from the discharge end of a belt conveyor when they are only partially frozen. This may be done to stiffen a product prior to coating it with breading or to stiffen a product prior to placing it on a wire mesh spiral freezer belt while still being quite soft and even wet in places. The products will not generally fall off the belt due to gravity nor will scrapers work well. The normal situation with scrapers is that soft, wet portions of the product will get under the scraper and prevent the product from coming off or even drag the rest of the product under the scraper with it. This happens even with the so called "finger scraper" design.

SUMMARY OF THE INVENTION

An object of the present invention is to provide a belt conveyor that facilitates removing of sticky products, especially food products, from a conveyor belt of the belt conveyor.

The present invention achieves this object in a belt conveyor comprising an endless conveyor belt and first and second rollers, the endless belt following a conveyance path from the first roller to the second roller and a return path from the second roller to the first roller. The belt conveyor further comprises a plurality of parallel lines extending over the conveyor belt along the whole conveyance path and then over and away from the second roller along a plane deviating from the plane of the conveyance path.

The lines may be stationary and the conveyor belt may have parallel longitudinal grooves for receiving the lines along the conveyance path.

In an alternative embodiment, the lines are endless and moveable in the same direction as the conveyor belt. In this alternative embodiment, the path of the lines is preferably separated from the lines in that a third roller is provided for separating the paths of the lines from the path of the conveyor belt after that both the conveyor belt and the lines have pasted over the second roller.

The conveyor belt can have parallel longitudinal grooves for receiving the lines along the conveyance path.

The belt conveyor may be driven by a drive system moving both the conveyor belt and the plurality of lines. The conveyor belt and the lines may be driven at substantially the same speed or at different speeds. As an alternative, the drive system may move the conveyor belt, while the lines are engaging the conveyor belt so as to be driven by the conveyor belt.

Preferably, a belt conveyor used for freezing of food products comprises impingement means directed towards at least one side of the conveyor belt along the conveyance path. The impingement means directs cold air at the food products in separate jets, thereby facilitating the freezing process.

Obviously, the belt conveyor may form part of a food treating apparatus which besides the conveyor belt comprises a housing, through which the conveyor belt is intended to convey food articles, a heat exchanger, and fan means for blowing air through the heat exchanger and against at least one side of the conveyor belt along the conveyance path. When the treatment of the food articles is freezing, the heat exchanger is an evaporator.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 is a cross-sectional view of a first embodiment of a conveyor belt that can be used in the belt conveyors shown in FIGS. 1 and 2;

FIG. 4 is a cross-sectional view of a second embodiment of a conveyor belt that can be used in the belt conveyors shown in FIGS. 1 and 2;

DETAILED DESCRIPTION OF THE PREFERRED EMBODIMENT

Figure 1:
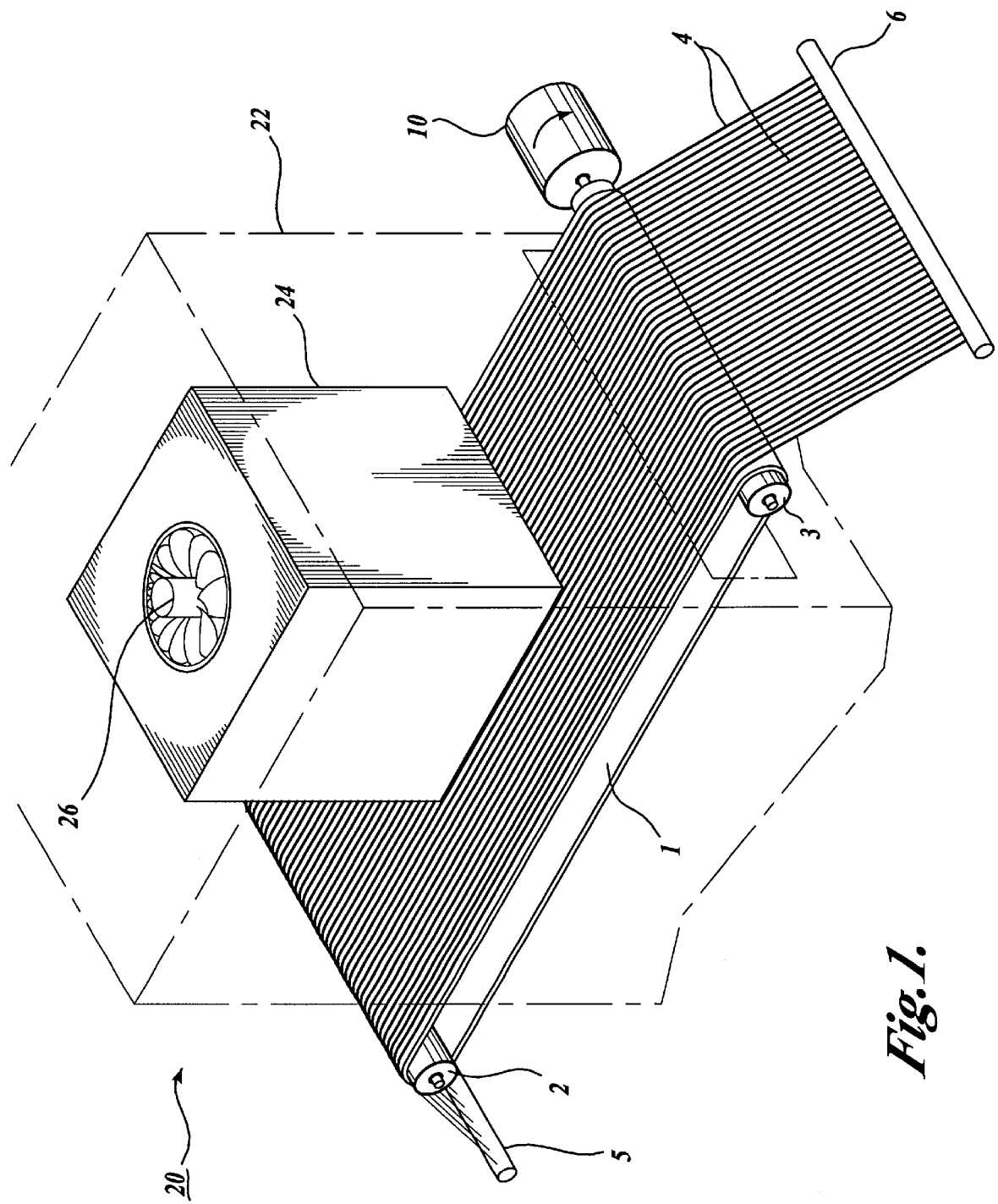
FIG. 1 is a schematic perspective view illustrating a first embodiment of a belt conveyor according to the present invention.

FIG. 1 discloses a belt conveyor having a conveyor belt 1 and two rollers 2 and 3, the conveyor belt 1 extending between and partly around the rollers 2 and 3.

More precisely, the conveyor belt 1 follows an upper path from the roller 2 to the roller 3, which upper path forms a conveyance path for products to be conveyed through a housing 22 in which the products, e.g. food articles, are treated during conveyance therethrough.

The conveyor belt 1 follows a lower path, a return path, from the roller 3 back to the roller 2.

Further, a plurality of lines 4 extend along the conveyance path of the conveyor belt 1 above the upper surface thereof. The lines 4 are disposed parallel to each other and they are fixed at one end near the roller 2 to a first stationary anchor bar 5 and are fixed at the other end near the roller 3 to a second stationary bar 6.

The lines 4 can be composed of any suitable material that is flexible, durable and capable of carrying a relatively high tensile load. Suitable materials may include nylon or other type of plastic material that may or may not be reinforced with high strength material, such as carbon or boron. One preferred material for the lines 4 is a monofiliment nylon. The lines could also be composed of a braided metal cable coated with a rubber or plastic sheath. Also, if the lines are driven or moved by the conveyor belt 1 itself, ideally a reasonably high coefficient of friction will exist between the conveyor and the lines. Preferably the lines 1 are of circular cross-section, but other cross-sectional shapes may be utilized, such as hexagonal or octagonal. Also, ideally the lines 4 are about 1.5 mm in diameter, but other small or larger diameters could be utilized.

At the rollers 2 and 3, the lines 4 deviate from the plane formed by the conveyor belt 1 in the conveyance path between the rollers 2 and 3 by extending partway around the periphery of these rollers and then extending longitudinally therefrom.

The conveyor belt 1 may be driven by the roller 3 such that products carried by the conveyor belt 1 when passing over the roller 3 will be separated from the conveyor belt 1 and slide downwardly on the lines 4. The roller 3 may be coupled to a drive motor 10 which can be in the form of an electric motor, a hydraulic motor, an air motor or other type of commercially available motor.

Figure 2:
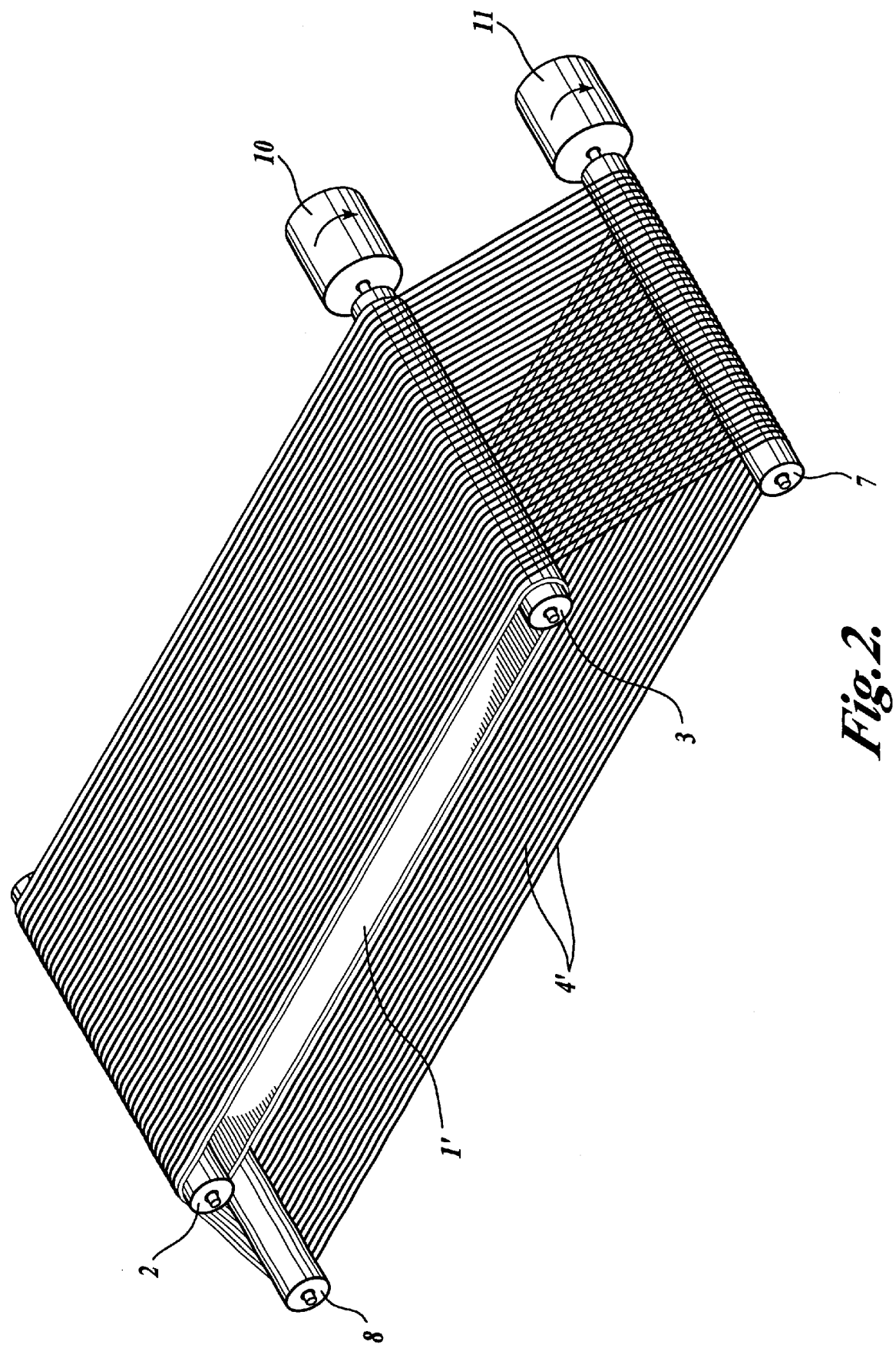
FIG. 2 is a schematic perspective view illustrating a second embodiment of a belt conveyor according to the present invention.

FIG. 2 illustrates a second and most preferred embodiment of the belt conveyor according to the invention. Here, the lines 4' are endless and follow the conveyance path from the roller 2 to the roller 3 in the same manner of the lines 4 shown in FIG. 1. However, the lines 4' extend from the roller 3 via rollers 7 and 8 back to the roller 2, deviating at the roller 3 in substantially the same downward direction as the lines 4 in FIG. 1.

The conveyor belt 1 in FIG. 2 may be driven by the roller 3 and the lines 4 may be frictionally driven by the belt 1 such that the conveyor belt 1 and the lines move with the same speed. Alternatively, the lines 4 may be driven separately, e.g. by the roller 7, in which case the conveyor belt 1 and the lines 4 may be driven at different speeds. In this regard, roller 7 is coupled to a drive motor 11 which may be the same type of motor as motor 10 discussed above.

As illustrated in FIG. 3, the conveyor belt 1 may have a substantially flat top surface such that the lines 4, 4' will be positioned on the top surface of the conveyor belt 1.

As illustrated in FIG. 4, an alternative conveyor belt 1' may have as many longitudinal, spaced-apart grooves 9 as there are lines 4, 4' for accommodating these lines, such that the lines 4, 4' may be positioned below, flush with the top surface of or above the top surface of the conveyor belt 1' depending on, for instance, the depth of the grooves 9 in relation to the thickness or diameter of the lines 4, 4'.

As illustrated in FIG. 1, the conveyor belt 1 consists of a part of an overall food treating apparatus 20. The apparatus 20 also includes a housing 22 through which the conveyor extends when carrying food articles thereon. A heat exchanger (evaporator) 24 is mounted above the conveyor 1 and a fan 26 blows air through the heat exchanger and onto the top surface of the belt, thereby chilling or, if desired, freezing the food articles carried by the conveyor. It is to be understood that the heat exchanger may be located to the side of the belt and then a duct, not shown, used to direct cold air from the heat exchanger to the belt.

Also, other arrangements of the apparatus 20 may be utilized without departing from the spirit of the scope of the present invention. For example, the air from fan 26 may be directed through a grate or a plate having a pattern of holes extending therethrough, thereby establishing a number of high-speed, discrete air jets that impinge on the food to be frozen. Applicant has found that impinging the cold air on the food reduces the thickness of the boundary layer, thereby increasing the rate of heat transfer from the cold air to the food. This technology is discussed in U.S. Pat. No. 5,408,921, incorporated herein by reference.

It goes without saying that the invention is not restricted to the embodiments described above, and that a variety of modifications is possible within the scope of the invention as defined in the appended claims.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A belt conveyor system for transporting objects thereon, comprising:
   an endless conveyor belt;
   first and second rollers,
   the endless conveyor belt following a conveyance path from the first roller to the second roller and a return path from the second roller to the first roller; and
   a plurality of parallel support lines extending over the conveyor belt and along the conveyance path, the parallel support lines then extending in a direction angularly from the conveyance path, the parallel support lines being structurally independent of the conveyor belt; wherein the parallel support lines are spaced apart a distance that is less than the width of the objects transported thereon whereby the objects do not fit between adjacent parallel support lines.

2. A belt conveyors system as claimed in claim 1, wherein the support lines are stationary relative to the endless belt.

3. A belt conveyor system as claimed in claim 1, further comprising impingement means directed towards at least one side of the conveyor belt along the conveyance path.

4. A belt conveyor system as claimed in claim 1, wherein the support lines are endless and moveable in the same direction as the conveyor path.

5. A belt conveyor system as claimed in claim 4, further comprising a third roller for separating the path of the support lines from the conveyance path of the conveyor belt after the support lines have extended partially around the second roller.

6. A belt conveyor system as claimed in claim 4, further comprising drive means for moving the conveyor belt and the plurality of support lines at substantially the same speed.

7. A belt conveyor system as claimed in claim 4, further comprising a drive system for moving the conveyor belt and the plurality of support lines at diffferent speeds.

8. A belt conveyor system as claimed in claim 4, further comprising a drive system for moving the conveyor belt, the support lines engaging the conveyor belt along so as to be moved thereby.

9. A belt conveyor system for transporting objects thereon, comprising:
   an endless conveyor belt;
   first and second rollers
   the endless conveyor belt following a conveyance path from the first roller to the second roller and a return path from the second roller to the first roller;
   a plurality of parallel support lines extending over the conveyor belt and along the conveyance path, the parallel support lines then extending in a direction angularly from the conveyance path, the parallel support lines being structurally independent of the conveyor belt;
   wherein the support lines are endless and moveable in the same direction as the conveyor belt;
   the belt conveyor system further comprising a third roller for separating the path of the support lines from the conveyance path of the conveyor belt after the support lines have extended partially around the second roller; and
   wherein parallel longitudinal grooves are formed in the conveyor belt for receiving the support lines therein.

10. A belt conveyor system for transporting objects thereon, comprising:

an endless conveyor belt;

first and second rollers the endless conveyor belt following a conveyance path from the first roller to the second roller and a return path from the second roller to the first roller;

a plurality of parallel support lines extending over the conveyor belt and along the conveyance path, the parallel support lines then extending in a direction angularly from the conveyance path, the parallel support lines being structurally independent of the conveyor belt;

wherein the support lines are endless and moveable in the same direction as the conveyor belt; and wherein the conveyor belt having portions defining parallel, longitudinal grooves extending lengthwise of the conveyor belt, the longitudinal grooves being sized and shaped to receive the support lines therein.

11. A food treating apparatus comprising a housing;

a belt conveyor structure in the housing for conveyance of food articles therethrough, said belt conveyor structure comprising first and second rollers, an endless conveyor belt following a conveyance path from the first roller to the second roller, and following a return path from the second roller to the first roller, and a plurality of support lines extending over the conveyor belt and along the conveyance path, the support lines then extending in a direction angularly from the conveyance path;

a heat exchanger; and a fan for blowing air through the heat exchanger and against at least one side of the conveyor belt along the conveyance path; wherein the parallel support lines are spaced apart a distance that is less than the width of the objects transported thereon whereby the objects do not fit between adjacent parallel support lines.

12. A food treating apparatus as claimed in claim 11, wherein the heat exchanger is an evaporator.

13. A belt conveyor comprising an endless conveyor belt;

first and second rollers;

the endless conveyor belt following a conveyance path from the first roller to the second roller and a return path from the second roller to the first roller;

a plurality of parallel lines extending over the conveyor belt and along the conveyance path, the parallel lines teen extending in a direction angularly from the conveyance path; and, wherein the conveyor belt comprises parallel longitudinal grooves formed therein, the grooves receiving the lines along the conveyance path.

14. The belt conveyor of claim 13, wherein the plurality of parallel lines are stationary relative to the endless belt.

15. The belt conveyor of claim 13, wherein the plurality of lines are endless and movable in the same direction as the conveyor belt.

16. The belt conveyor of claim 15, further comprising a third roller for separating the path of the parallel lines from the conveyance path of the conveyor belt after the parallel lines have extended partially around the second roller.

17. The belt conveyor of claim 15, further comprising drive means for moving the conveyor belt and the plurality of parallel lines at substantially the same speed.

18. The belt conveyor of claim 15, further comprising a drive system for moving the conveyor belt and the plurality of parallel lines at different speeds.

19. The belt conveyor of claim 15, further comprising a drive system for moving the conveyor belt, the parallel lines engaging the conveyor belt so as to be moved thereby.

20. The belt conveyor of claim 15, further comprising impingement means directed towards at least one side of the conveyor belt along the conveyance path.

21. A belt conveyor for transporting objects thereon, comprising:

an endless conveyor belt;

first and second rollers engaged with the endless conveyor belt, the endless conveyor belt defining a conveyance path from the first roller to the second roller and defining a return path from the second roller to the first roller;

a plurality of parallel lines extending along the top of the conveyor belt lengthwise of the belt and along the conveyance path, the lines then extending initially partially around the second roller and then away from the conveyance path of the conveyor belt; said parallel lines being structurally independent of the conveyor belt;

wherein the lines are endless and movable in the same direction as the movement of the conveyor belt; and wherein the endless belt having portions defining parallel longitudinal grooves formed lengthwise in the conveyor belt for receiving the lines thereon.

22. A belt conveyor for transporting objects thereon, comprising:

(a) an endless conveyor belt;

(b) first and second rollers engaged with the endless conveyor belt, the endless conveyor belt defining a conveyance path from the first roller to the second roller and defining a return path from the second roller to the first roller; and (c) a plurality of parallel lines extending along the top of the conveyor belt lengthwise of the belt and along the conveyance path, the lines then extending initially partially around the second roller and then away from the conveyance path of the conveyor belt; said parallel lines being structurally independent of the conveyor belt; wherein the parallel lines are spaced apart a distance that is less than the width of the objects transported thereon whereby the objects do not fit between adjacent parallel support lines.

23. The belt conveyor according to claim 22, further comprising a drive train for moving the conveyor belt and the plurality of lines at substantially the same speed.

24. The belt conveyor according to claim 22, further comprising a drive train for moving the belt conveyor and the plurality of lines at different speeds.

25. The belt conveyor according to claim 22, further comprising a drive train for moving he conveyor belt, with the engagement of the lines with the conveyor belt causing the lines to be moved along with the moving conveyor belt.

26. The belt conveyor of claim 22, wherein the lines extend tangentially to the second roller when deviating from the path of the conveyor belt.

27. The conveyor according to claim 22, wherein the lines are stationary relative to the endless belt.

28. The belt conveyor according to claim 22, wherein the lines are endless and movable in the same direction as the movement of the conveyor belt.

29. The belt conveyor according to claim 28, further comprising a separator for separating the paths of the lines from the conveyance path of the conveyor belt after the lines have extended partially around the second roller.

30. A belt conveyor for transporting objects therein, comprising:
   (a) an endless conveyor belt;
   (b) first and second rollers engaged with the endless conveyor belt, the endless conveyor belt defining a conveyance path from the first roller to the second roller and defining a return path from the second roller to the first roller;
   (c) a plurality of parallel lines extending along the top of the conveyor belt lengthwise of the belt and along the conveyance path, the lines then extending initially partially around the second roller and then away from the conveyance path of the conveyor belt; and
   wherein the conveyor belt includes parallel, longitudinal grooves formed therein, the grooves being sized and shaped to receive the lines extending along the conveyance path.

31. The belt conveyor of claim 30, further comprising a drive train for moving the conveyor belt and the plurality of parallel lines at substantially the same speed.

32. The belt conveyor of claim 30, further comprising a drive train for moving the belt conveyor and the plurality of parallel lines at different speeds.

33. The belt conveyor of claim 30, further comprising a drive train for moving the conveyor belt, with the engagement of the plurality of parallel lines with the conveyor belt causing the lines to be moved along with the moving conveyor belt.

34. The belt conveyor of claim 30, wherein the plurality of parallel lines are endless and movable in the same direction as the movement of the conveyor belt.

35. The belt conveyor of claim 34, further comprising a seperator for seperating the paths of the plurality of parallel lines from the conveyance path of the conveyor belt after the lines have extended partially around the second roller.

* * * * *

UNITED STATES PATENT AND TRADEMARK OFFICE
CERTIFICATE OF CORRECTION

PATENT NO. : 6,315,100 B1
DATED : November 13, 2001
INVENTOR(S) : A. Lebedev et al.

It is certified that error appears in the above-identified patent and that said Letters Patent is hereby corrected as shown below:

Column 4,
Line 20, "conveyors system" should read -- conveyor system --
Line 27, "conveyor path." should read -- conveyor belt. --
Line 41, "belt along so as" should read -- belt so as --

Column 5,
Line 48, "teen" should read -- then --

Signed and Sealed this

Ninth Day of April, 2002

Attest:

Attesting Officer

JAMES E. ROGAN
Director of the United States Patent and Trademark Office